US012782172B1

(12) United States Patent

Martim et al.

(10) Patent No.: US 12,782,172 B1

(45) Date of Patent: Nov. 3, 2026

(54) MOUNTING ASSEMBLY WITH REDUCED FRICTION ELEMENT

(71) Applicant: Tractian Technologies Inc, Atlanta, GA (US)

(72) Inventors: Vinicius Martim, São Paulo (BR); Pedro Calori Badini, São Paulo (BR); Flávio Roberto Bizerra Junior, São Paulo (BR); Renato Matias Correa, São Paulo (BR)

(73) Assignee: Tractian Technologies Inc, Atlanta, GA (US)

(*) Notice: Subject to any disclaimer, the term of this patent is extended or adjusted under 35 U.S.C. 154(b) by 0 days.

(21) Appl. No.: 19/546,105

(22) Filed: Feb. 20, 2026

Related U.S. Application Data

(63) Continuation-in-part of application No. 19/297,904, filed on Aug. 12, 2025, now Pat. No. 12,595,814.

(51) Int. Cl.

| | |
|---|---|
| ***F16B 9/00*** | (2006.01) |
| ***F16B 43/00*** | (2006.01) |
| ***G01D 11/24*** | (2006.01) |
| ***G01D 11/30*** | (2006.01) |

(52) U.S. Cl.

CPC ............ *G01D 11/30* (2013.01); *F16B 43/002* (2013.01); *G01D 11/245* (2013.01); *F16B 9/05* (2018.08)

(58) Field of Classification Search

CPC .... F16B 7/18; F16B 7/182; F16B 9/05; F16B 9/052; F16B 9/054; F16B 17/006; Y10T 403/3933; Y10T 403/3946; Y10T 403/3981; Y10T 403/3986; Y10T 403/4608; Y10T 403/299; Y10T 403/343

USPC .... 411/389; 403/56, 68, 192, 194, 199, 200, 403/233

See application file for complete search history.

(56) References Cited

U.S. PATENT DOCUMENTS

| | | | | |
|---|---|---|---|---|
| 4,252,458 A * | 2/1981 | Keen | ..................... | F16B 7/0406<br>403/287 |
| 7,624,618 B2 * | 12/2009 | Bader | ..................... | F16B 35/06<br>411/382 |
| 8,770,902 B1 * | 7/2014 | Miller | ..................... | F16B 5/0208<br>29/451 |
| 12,165,491 B2 * | 12/2024 | Redaelli | ............... | G08B 21/187 |

* cited by examiner

*Primary Examiner* — Amber R Anderson
*Assistant Examiner* — Zachary A Hall
(74) *Attorney, Agent, or Firm* — Cognition IP, P.C.; Edward Steakley; Justin White

(57) ABSTRACT

A mounting assembly couples a separate mechanical component to a separate mechanical asset and includes a fastening component, sleeve, insert, and low friction washer. The fastening component has a flange and an extending threaded protrusion insertable into a threaded opening of the mechanical asset. The sleeve has wall(s) coupled to an endcap at one end to define an inner volume having a sleeve opening at the opposite end. The endcap includes an opening that allows the threaded protrusion to pass therethrough while the flange remains rotatably within the inner volume. The insert fits within the sleeve opening keeping the flange within the inner volume and has a threaded inner opening that accepts insertion of a threaded portion of the mechanical component such that the mechanical component couples to the mechanical asset at a specific rotational orientation. The low friction washer reduces friction between the fastening component flange and sleeve endcap.

20 Claims, 14 Drawing Sheets

MOUNTING ASSEMBLY WITH REDUCED FRICTION ELEMENT

CROSS-REFERENCE TO RELATED APPLICATION

This application is a continuation-in-part of and claims priority to commonly owned U.S. application Ser. No. 19/297,904, filed Aug. 12, 2025, and titled "SELF-ALIGNING THREADED MOUNTING ASSEMBLY," which application is hereby incorporated by reference in its entirety herein.

TECHNICAL FIELD

The present disclosure relates generally to mechanical coupling arrangements, and more particularly to improved mounting assemblies for coupling mechanical components.

BACKGROUND

Industrial machinery typically involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, some vibration sensors must be field installed at a specific rotational orientation relative to any industrial equipment to which it is coupled and intended to monitor.

Unfortunately, it is sometimes difficult to control the final rotational orientation of a given sensor relative to its monitored device. Where threaded mountings are used, for example, the fixed nature of mating threads can determine the final rotational orientation of a sensor. This can then lead to misalignment of the sensor reference axis. While these issues can be corrected by traditional alignment methods such as double nuts or threaded collars, these approaches can leave portions of the thread exposed, which can compromise mechanical strength and reliability under vibration, humidity, and/or chemical exposure. Additionally, these traditional approaches can complicate field maintenance and can lead to loss of orientation during servicing.

Although traditional ways of coupling industrial items with threaded matings have worked in the past, improvements are always helpful. In particular, what is desired are improved threaded coupling arrangements that provide precise rotational alignments for coupled items.

SUMMARY

It is an advantage of the present disclosure to provide improved threaded coupling arrangements that provide precise rotational alignments for coupled items. The disclosed features, apparatuses, systems, and methods relate to self-aligning mounting assemblies, which can include mechanical arrangements having threaded mating components, integrated axis retention during rotational coupling, minimally exposed threaded portions, and adhesive-free interference fits, among other advantageous features. In particular, the disclosed embodiments can involve the use of mounting assemblies having mechanically interlocking fastening components, sleeves, and inserts that facilitate the ready fastening of a mechanical component to a mechanical asset at a specific rotational alignment in a simple and streamlined manner.

In various embodiments of the present disclosure, a mounting assembly can include a fastening component, a sleeve, an insert, and a reduced friction element. The fastening component can include a threaded protrusion extending from a flange, with the threaded protrusion defining a longitudinal axis and a first diameter and the flange defining a second diameter that is greater than the first diameter. The threaded protrusion can be configured to be rotationally inserted into a threaded opening of a separate mechanical asset. The sleeve can have one or more walls coupled to an endcap at one end thereof to define an inner volume having a sleeve opening at another end opposite the endcap. The inner volume can be configured to hold the flange therein such that the flange is rotatable within the inner volume, and the endcap can include an endcap opening configured to allow the threaded protrusion to pass therethrough while the flange remains within the inner volume. The insert can be fitted within the sleeve opening such that the flange is fully constrained within the inner volume. The insert can include a threaded inner opening aligned along the longitudinal axis of the fastening component threaded protrusion and configured to accept a rotational insertion therein of a threaded portion of a separate mechanical component such that the separate mechanical component is coupled to the separate mechanical asset at a specific rotational orientation relative to the separate mechanical asset. The reduced friction element can be located between the fastening component flange and the sleeve endcap. The reduced friction element can substantially reduce rotational friction between the fastening component flange and the sleeve endcap when the fastening component is clamped onto the sleeve and rotational torque is applied to the fastening component or the sleeve.

In various detailed embodiments, the reduced friction element can be a washer having an outer diameter that is about the same as an outer diameter of the fastening component flange and an inner opening diameter that is slightly larger than an outer diameter of the fastening component threaded protrusion. The reduced friction element can be formed from a polytetrafluoroethylene ("PTFE") material. The fastening component can include a tightening feature at a top surface of the flange, and the tightening feature can be configured to facilitate rotational tightening of the threaded protrusion into the threaded opening of the separate mechanical asset. The tightening feature can be configured to be accessed via the threaded inner opening of the insert while the flange is fully constrained within the inner volume of the sleeve. The fastening component and the sleeve can be configured such that the rotational orientation of the sleeve becomes fixed when the threaded protrusion of the fastening component is sufficiently tightened into the threaded opening of the separate mechanical asset. The sleeve wall(s) can define an outer surface that includes at least three pairs of opposing flat regions.

In further detailed embodiments, the insert can be rigidly coupled to the sleeve within the sleeve opening such that the insert is laterally and rotationally fixed with respect to the sleeve, for example, such as where the insert is press fit within the sleeve. An internal thread of the threaded inner opening can have a rotational orientation arranged to match at least one exterior feature of the sleeve. In some arrangements, tightening the threaded portion of the separate mechanical component into the threaded inner opening of the insert to a specified torque value can result in achieving an exact rotational orientation of the separate mechanical component relative to an exterior feature of the sleeve. This tightening to the specified torque value while the mounting assembly is fastened to the separate mechanical asset can result in the exact rotational orientation corresponding to the specific rotational orientation of the separate mechanical component relative to the separate mechanical asset. The sleeve can include an upper surface configured to contact and provide a physical stop against a bottom surface of the separate mechanical component when the threaded portion of the separate mechanical component is inserted into and sufficiently rotated within the threaded inner opening, such as to a specific torque value. The insert can also have an upper surface arranged to be lower than or flush with the upper surface of the sleeve.

In further embodiments of the present disclosure, a mounting system configured to mount a sensor to a separate mechanical asset can include a sensor and a mounting assembly. The sensor can include a sensor protrusion with a threaded portion configured to facilitate mounting the sensor to the separate mechanical asset. The mounting assembly can be configured to be coupled to the sensor and can include a fastening component, a sleeve, an insert, and a reduced friction element. The fastening component can include a threaded protrusion extending from a flange, the threaded protrusion defining a first diameter and the flange defining a second diameter that is greater than the first diameter. The threaded protrusion can be configured to be rotationally inserted into a threaded opening of the separate mechanical asset. The fastening component can also include a tightening feature at a top surface of the flange, the tightening feature configured to facilitate rotational tightening of the threaded protrusion into the threaded opening of the separate mechanical asset. The sleeve can have one or more walls coupled to an endcap at one end thereof to define an inner volume having a sleeve opening at another end opposite the endcap. The inner volume can be configured to hold the flange therein such that the flange is rotatable within the inner volume. The endcap can include an endcap opening configured to allow the threaded protrusion to pass therethrough while the flange remains within the inner volume. The insert can be fitted within the sleeve opening such that the insert is unable to move relative to the sleeve and the flange is fully constrained within the inner volume. The insert can include a threaded inner opening configured to accept a rotational insertion therein of the sensor protrusion such that the sensor is mounted to the separate mechanical asset at a specific rotational orientation relative to the separate mechanical asset. The tightening feature of the fastening component can be configured to be accessed via the threaded inner opening of the insert while the flange is fully constrained within the inner volume of the sleeve. The reduced friction element can be located between the fastening component flange and the sleeve endcap. The reduced friction element can substantially reduce rotational friction between the fastening component flange and the sleeve endcap when the fastening component is clamped onto the sleeve and rotational torque is applied to the fastening component or the sleeve.

In various detailed embodiments, the reduced friction element can be a washer having an outer diameter that is about the same as an outer diameter of the fastening component flange and an inner opening diameter that is slightly larger than an outer diameter of the fastening component threaded protrusion. Further, the reduced friction element can be formed from a polytetrafluoroethylene ("PTFE") material. The one or more walls of the sleeve can define an outer surface that includes at least three pairs of opposing flat regions. In some arrangements, each of the fastening component, the sleeve, the insert, and the reduced friction element can define a central longitudinal axis, and each of these central longitudinal axes can align with each other and are configured to align with central longitudinal axes of the threaded opening of the separate mechanical asset and the threaded portion of the sensor when the mounting assembly mounts the sensor to the separate mechanical asset.

In still further embodiments of the present disclosure, various methods of mounting a separate mechanical component to a separate mechanical asset using a mounting assembly are provided. Pertinent process steps can include coupling the mounting assembly to the separate mechanical asset, setting a rotational orientation of a mounting assembly sleeve, tightening the mounting assembly to the separate mechanical asset, and coupling the separate mechanical component to the mounting assembly. The mounting assembly can have a fastening component, a sleeve, and an insert. Coupling the mounting assembly to the separate mechanical asset can include inserting a threaded protrusion of the fastening component into a threaded opening of the separate mechanical asset. Setting the rotational orientation of the sleeve with respect to the separate mechanical asset can be done while a flange of the fastening component remains within an inner volume of the sleeve and the threaded protrusion extends away from the sleeve and into the threaded opening of the separate mechanical asset. Tightening the fastening component can be done into the threaded opening of the separate mechanical asset until the sleeve cannot freely rotate with respect to the fastening component or to the separate mechanical asset. Coupling the separate mechanical component to the mounting assembly can involve rotatably inserting a threaded portion of the separate mechanical component into a threaded inner opening of the insert while the insert is fitted within the inner volume such that the separate mechanical component is coupled to the separate mechanical asset at a specific rotational orientation relative to the separate mechanical asset. In various detailed embodiments, further process steps can include creating the mounting assembly, forming the threaded opening within the separate mechanical asset, tightening the separate mechanical component into the insert to a proper torque, and confirming that the specific rotational orientation is a proper relative rotation of the separate mechanical component to the separate mechanical asset.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, devices, systems, and methods of use for self-aligning threaded mounting assemblies. These drawings in no way limit any changes in form and detail that may be made to the disclosure by one skilled in the art without departing from the spirit and scope of the disclosure.

DETAILED DESCRIPTION

Figure 1A:
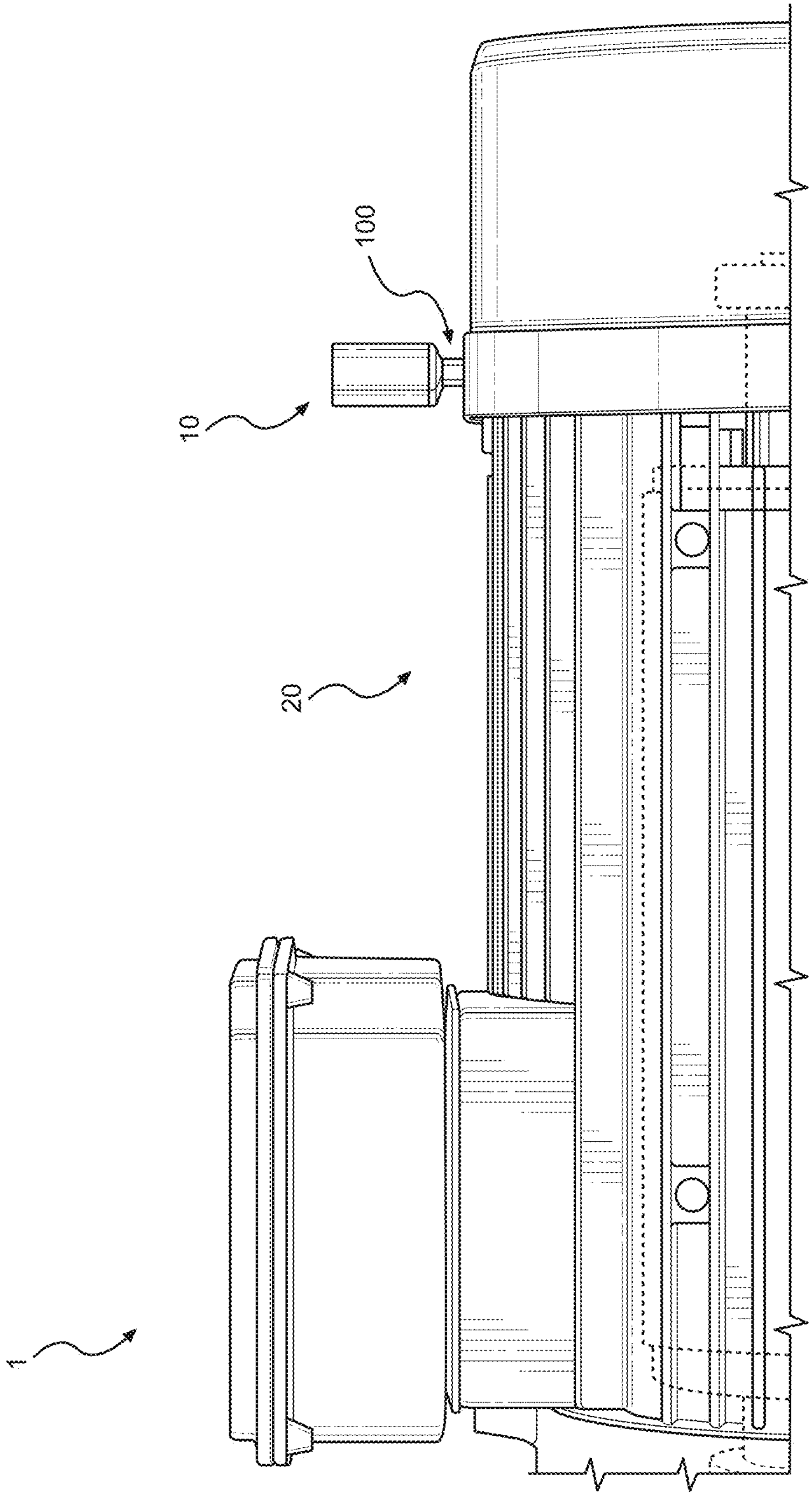
FIG. 1A illustrates in side elevation view an environment with a mechanical component coupled to a mechanical asset using an example mounting assembly according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving mounting assemblies. In particular, this can include mounting assemblies configured to mount a separate mechanical component to a separate mechanical asset in a manner that provides for specific rotational alignments for the coupled items. In specific arrangements, the mechanical component can be an industrial sensor, such as a vibration sensor, while the mechanical asset can be industrial mechanical equipment, such as an industrial motor.

As will be readily appreciated by those of skill in the art, the use of some industrial sensors can depend heavily on a sensor being installed properly with respect to its monitored or tracked industrial equipment item or other asset. Proper installation of a sensor can involve the correct placement, mounting, fixture stiffness, and rotational alignment with respect to its tracked item. As one example, many types of standard vibration sensors operate accurately when they are mounted directly to an industrial equipment item that they are monitoring, with such mounting being at an optimal location on the item as well as an optimal relative rotational orientation with respect to the item being monitored for vibration.

The disclosed embodiments involve improved threaded coupling arrangements for self-aligning mounting assemblies, which can include mechanical arrangements having threaded mating components, integrated axis retention during rotational coupling, minimally exposed threaded portions, and adhesive-free interference fits, among other advantageous features. In particular, the disclosed mounting assemblies can include mechanically interlocking fastening components, sleeves, and inserts that facilitate the ready fastening of a mechanical component to a mechanical asset at a specific rotational alignment in a simple and streamlined manner.

Although various embodiments disclosed herein discuss the specific application of mounting a vibration sensor to an industrial motor, it will be readily appreciated that the disclosed features, apparatuses, systems, and methods for mounting assemblies can also be used in other applications and environments where mounting a separate mechanical component to a separate mechanical asset is desired. Furthermore, while some examples are provided for specific tools, components, and materials, it will be understood that these can be replaced with any suitable substitute or alternative tools, components, and/or materials that take advantage of the disclosed features. Other applications, arrangements, and extrapolations beyond the illustrated embodiments are also contemplated.

Referring first to FIG. 1A, an environment with a mechanical component coupled to a mechanical asset using an example mounting assembly is illustrated in side elevation view. Industrial environment 1 can include a relatively smaller mechanical component 10 that is mounted to a relatively larger mechanical asset 20 by way of a mounting assembly 100. In various arrangements, mechanical component 10 can be a sensor, such as a vibration sensor, for example. Other types of sensors are also possible, such as, temperature, current, pressure, and moisture sensors, with other types of mechanical components suitable for mounting also being possible. In various arrangements, mechanical asset 20 can be a manufacturing or industrial item, such as an industrial motor, although other types of mechanical assets are also possible.

As is generally well known, there are many different ways to mount separate components within an industrial setting or environment, and some mounting techniques involve controlling for a specific or precise rotational orientation of mounted components. Such a specific rotational orientation can be desirable where mechanical component 10 is a vibration sensor that is mounted to a larger vibrating mechanical asset 20, such as an industrial motor, for example. Mounting assembly 100 can be configured to mount mechanical component 10 to mechanical asset 20 in a manner that results in a specific rotational orientation of mechanical component 10 with respect to mechanical asset 20. Mounting assembly 100 can be designed to facilitate such a rotationally precise mounting in a convenient and streamlined manner based on its interlocking component arrangement, as set forth in greater detail below.

Figure 1B:
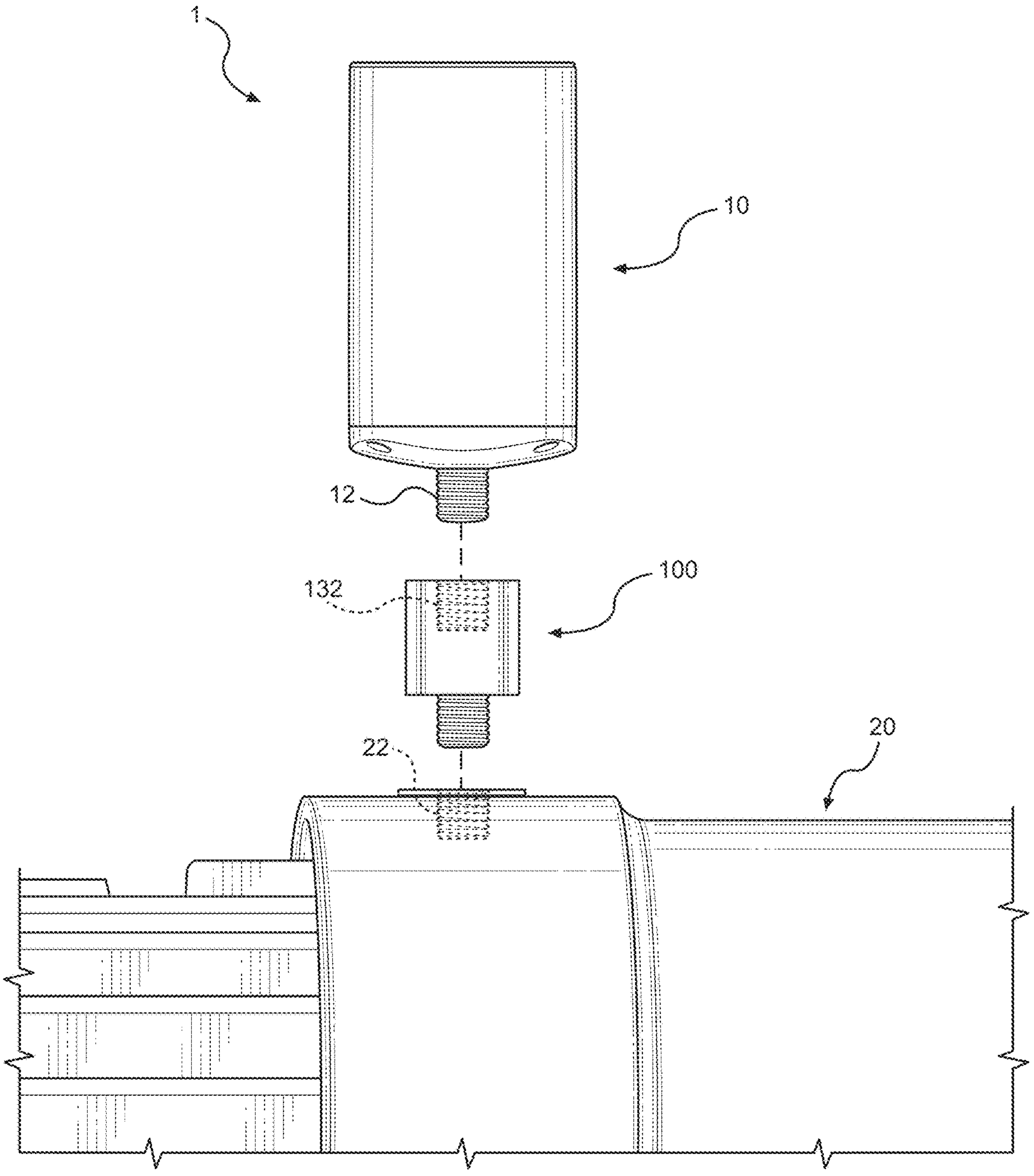
FIG. 1B illustrates in side exploded close-up view the environment of FIG. 1A with the mechanical component, mechanical asset, and example mounting assembly all uncoupled according to one embodiment of the present disclosure.

FIG. 1B illustrates in side exploded close-up view the environment of FIG. 1A with the mechanical component, mechanical asset, and example mounting assembly all uncoupled from each other. In some arrangements, mechanical component 10 and mechanical asset 20 can be separate items that are already available with a desire to mount, attach, or otherwise couple the mechanical component to the mechanical asset, such as by way of using mounting assembly 100. Mechanical component 10 can be relatively smaller compared with mechanical asset 20 such that coupling these items together can involve moving and mounting a vibration sensor or other smaller portable mechanical component along with mounting assembly 100 onto an industrial motor or other larger stationary mechanical asset.

In various embodiments, mounting assembly 100 can be attached or coupled in one or more ways to both mechanical component 10 and mechanical asset 20, and this can involve one or more features on each of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor to another item. Mounting assembly 100 can have a threaded inner opening 132 configured to receive threaded portion 12 of mechanical component 10 to facilitate directly attaching or otherwise coupling these two items, such as by rotational insertion of threaded portion 12 into threaded inner opening 132. Mounting assembly 100 can also have a threaded protrusion 112 extending outward therefrom, which can be configured to be rotationally inserted into a threaded opening 22 located on mechanical asset 20. In some arrangements, these threaded attachment features can be designed for ready direct attachment and removal of these items with respect to each other. Further descriptions for each of these items and features are provided in greater detail below.

Figure 2:
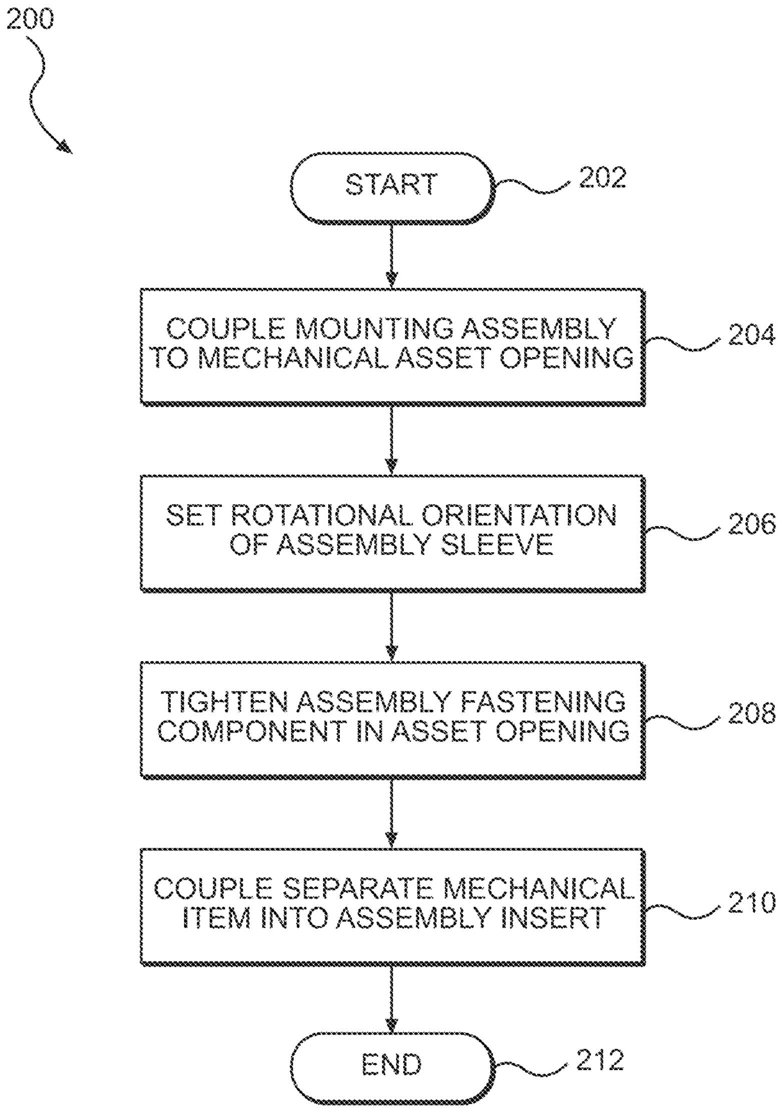
FIG. 2 illustrates a flowchart of an example summary method of mounting a mechanical component to a mechanical asset using a mounting assembly according to one embodiment of the present disclosure.

Moving next to FIG. 2, a flowchart is provided of an example summary method of mounting a mechanical component to a mechanical asset using a mounting assembly. Summary method 200 can represent one broad aspect of various overall methods of mounting a mechanical component to a mechanical asset, and it will be understood that various other steps and details of such a broad aspect and overall methods are not provided here for purposes of simplicity. While summary method 200 and other disclosed methods can involve mounting a vibration sensor to an industrial motor, for example, it is also contemplated that the various disclosed methods can alternatively be applied to other types of mechanical components and mechanical assets.

After a start step 202, a first process step 204 can involve coupling the mounting assembly to the mechanical asset. This can involve coupling the mounting assembly to a threaded opening within the mechanical asset, such as by inserting a threaded protrusion of the mounting assembly into the threaded opening of the mechanical asset. In some embodiments, the mounting assembly can include a fastening component with the threaded protrusion, a sleeve, and an insert, various arrangements for which are provided in greater detail below.

At a following process step 206, a rotational orientation of the mounting assembly can be set with respect to the mechanical asset. This can involve setting a rotational orientation of a mounting assembly sleeve with respect to the mechanical asset. In some arrangements, this can be done while a flange of the mounting assembly fastening component remains within an inner volume of the sleeve and the mounting assembly threaded protrusion extends away from the sleeve and into the threaded opening of the mechanical asset.

At the next process step 208, the mounting assembly can be tightened against the mechanical asset. This can involve tightening the mounting assembly fastening component into the threaded opening of the mechanical asset until the mounting assembly sleeve cannot freely rotate with respect to the fastening component or to the mechanical asset. In some arrangements, this can be done while the mounting assembly sleeve remains at the set rotational orientation.

Subsequent process step 210 can involve coupling the mechanical component to the mounting assembly. This can be done, for example, by rotatably inserting a threaded portion of the mechanical component into a threaded inner opening of the mounting assembly insert while the insert is fitted within the mounting assembly sleeve inner volume such that the mechanical component is coupled to the mechanical asset at a specific rotational orientation relative to the mechanical asset.

Summary method 200 can then end at end step 212. As noted above, the mechanical component and mechanical asset can be separate items from each other and also from the mounting assembly, which can be used to mount one of these separate items to the other. In some arrangements, one or more of the foregoing steps can be performed simultaneously or in a different order. For example, steps 206 and 208 can be performed simultaneously in some arrangements. Not all steps are necessary in all situations, and additional steps and details can be added. Further steps, details, and variations are provided in detailed method 500 set forth below.

Figure 3A:
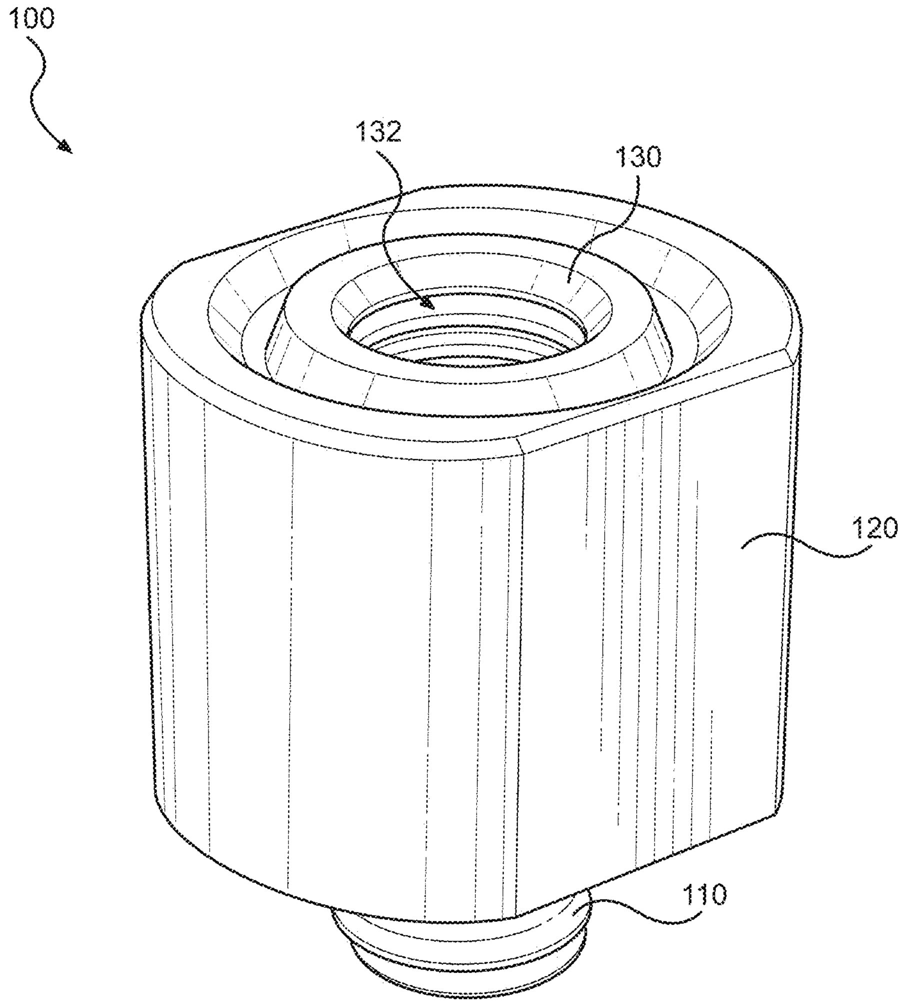
FIG. 3A illustrates in top perspective view an example mounting assembly according to one embodiment of the present disclosure.
Figure 3B:
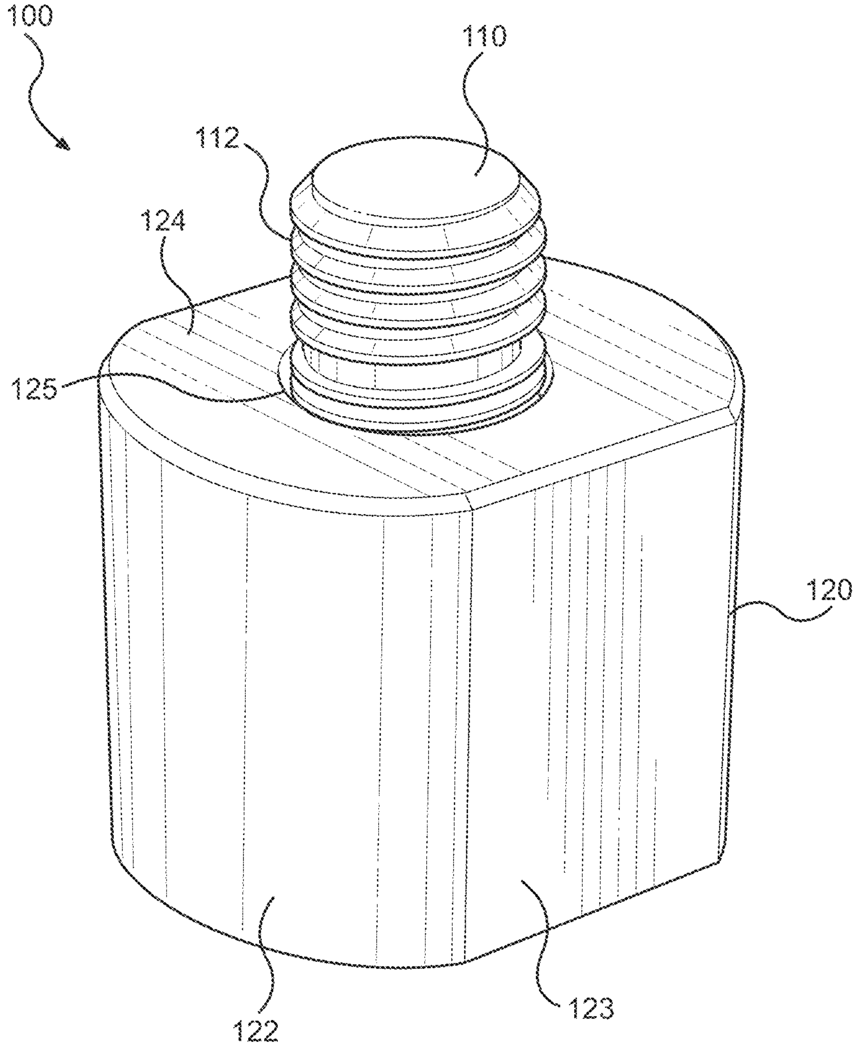
FIG. 3B illustrates in bottom perspective view the mounting assembly of FIG. 3A according to one embodiment of the present disclosure.
Figure 3C:
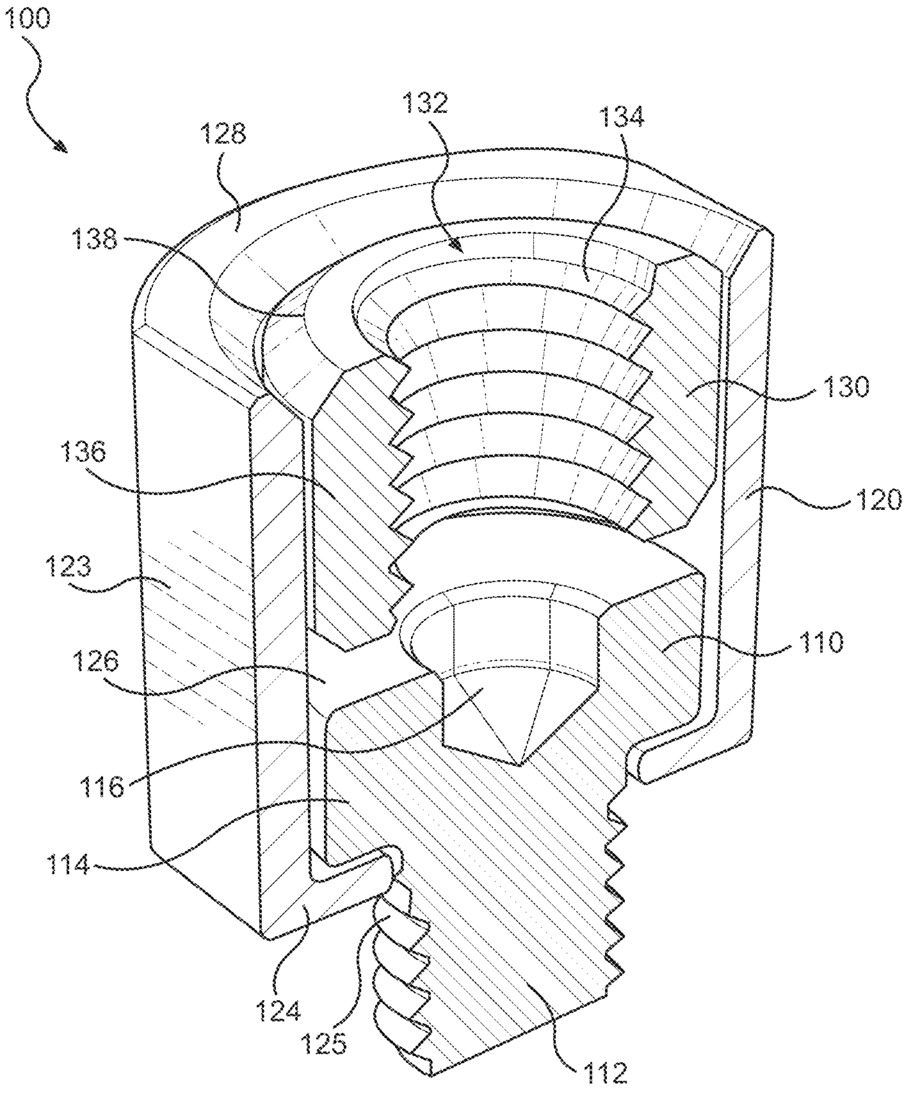
FIG. 3C illustrates in side perspective cross-section view the mounting assembly of FIG. 3A according to one embodiment of the present disclosure.

Continuing with FIGS. 3A-3C, an example mounting assembly is illustrated in top perspective, bottom perspective, and side perspective cross-section views respectively. As noted above, mounting assembly 100 can be configured to mount or otherwise couple a separate mechanical component to a separate mechanical asset, such as a vibration sensor to an industrial motor. Mounting assembly 100 can include three combined items: a fastening component 110, a sleeve 120, and an insert 130. In some arrangements, these three items 110, 120, 130 can mechanically interlock to form a mounting assembly 100 that is configured to facilitate the ready mounting or fastening of the mechanical component to the mechanical asset at a specific rotational alignment in a simple and streamlined manner. In some arrangements, these three items 110, 120, 130 interlock such that they are not readily disassembled from each other.

Fastening component 110 can include a threaded protrusion 112 extending away from a flange 114, and a tightening feature 116 located at a top surface of the flange, among other possible features. In some arrangements, fastening component 110 and all of its features can be integrally formed from any suitable material, such as stainless steel, for example. Threaded protrusion 112, which can be seen in FIGS. 1B, 3A, 3B, and 3C, can define a longitudinal axis and a first diameter, and can be configured to be rotationally inserted into a threaded opening of a separate mechanical asset. Threaded protrusion 112 can thus be used to mount or fasten mounting assembly 100 into a threaded opening on a separate mechanical asset, as noted above.

As shown in FIG. 3C, flange 114 can be held within sleeve 120 while threaded protrusion 112 extends away from the sleeve. Flange 114 can define a second diameter that is greater than the first diameter (of threaded protrusion 112), such that the flange portion of fastening component 110 cannot escape from inside sleeve 120 through sleeve opening 125 or threaded inner opening 132 of insert 130. Tightening feature 116 can be configured to facilitate rotational tightening of threaded protrusion 112 into a threaded opening of a separate mechanical asset, such as by rotating fastening component 110 at tightening feature such that the entire fastening component rotates as a combined item. Tightening feature 116 can be configured to be accessed via threaded inner opening 132 of insert 130 while flange 114 is fully constrained within inner volume 126 of sleeve 120. Tightening feature 116 can include one or more features configured for facilitating tightening by way of, for example, a hex key, screwdriver, socket wrench, or any other suitable torquing or tightening tool.

Sleeve 120 can include one or more walls 122 coupled to an endcap 124 at one end thereof to define inner volume 126, which can have an open end or "sleeve opening" at the end opposite the endcap, with a sleeve upper surface 128 surrounding the sleeve opening, among other possible features. In some arrangements, sleeve 120 and all of its features can be integrally formed from any suitable material, such as stainless steel, for example. A single fully or partially circular wall 122 can form around an outer circumference of sleeve 120, and the one or more walls of the sleeve can define an outer surface that includes at least one pair of opposing flat regions opposing flat regions 123. Such flat regions 123 can be sized and shaped to accommodate a standard size wrench or tool to facilitate a controlled rotation or held position for sleeve 120, as will be readily appreciated.

Endcap 124 can have an endcap opening 125 that can be sized and shaped to allow threaded post or protrusion 112 of fastening component 110 to pass therethrough while fastening component flange 114 remains within inner volume 126. One or both of flange 114 and inner volume 126 can be sized and shaped such that the flange is rotatable within the inner volume while remaining therein. As will be readily appreciated, this can allow sleeve 120 to remain stationary, such as at a set rotational position, while fastening component 110 rotates such that threaded protrusion 112 can be rotatably inserted into a threaded opening on a separate mechanical asset.

Insert 130 can include a threaded inner opening 132 having a thread 134, outer wall surface 136, and insert upper surface 138, among other possible features. Insert 130 and all of its features can be integrally formed from any suitable material, such as stainless steel, for example. As noted above, threaded inner opening 132 can be configured to accommodate a threaded portion of a separate mechanical component, such as that which is shown in FIG. 1B above. Insert 130 can be press fit, friction fitted, or otherwise placed as shown within the sleeve opening of sleeve 120 so that the insert is rigidly coupled to the sleeve within the sleeve opening in a manner such that the insert is laterally and rotationally fixed with respect to the sleeve. As such, outer wall surface 136 of insert 130 can be configured to form a press fit or other friction based fit with the inner surface of sleeve 120 within inner volume 126.

When fastening component 110 is already located with respect to sleeve 120, fitting insert 130 into the sleeve 120 can the result in flange 114 being fully constrained within inner volume 126 of the sleeve. When installed properly, threaded inner opening 132 can be aligned along the longitudinal axis of threaded protrusion 112 of fastening component 110, and can be configured to accept a rotational insertion therein of a threaded portion of a vibration sensor or other suitable separate mechanical component. Sleeve upper surface 128 of sleeve 120 can be arranged to be flush with or higher than insert upper surface 138 of insert 130. In other words, insert 130 can have an insert upper surface 138 that is set or arranged to be lower than or flush with sleeve upper surface 128 of sleeve 120. In some arrangements, one or both of these sleeve and insert upper surfaces 128, 138 can be configured to provide a hard stop against a bottom surface of a separate mechanical component being installed into mounting assembly 100, as detailed below. Proper insertion of the separate mechanical component can result in the separate mechanical component being coupled to the separate mechanical asset at a specific rotational orientation relative to the separate mechanical asset.

As shown in FIG. 3C, an interstitial clearance can exist between flange 114 of fastening component 110 and insert 130 to permit free movement of the fastening component with respect to the insert. Sufficient clearance can also exist between flange 114 and the inner surfaces of sleeve 120 about inner volume 126. This can allow for controlled angular rotation of fastening component 110 while flange 114 is inside inner volume 126 before a final torque is applied to the fastening component, which final torque can lock the fastening component in place against sleeve 120. Such freely available movement prior to applying a final torque can enable a precise rotational alignment of mounting assembly 100 with respect to a separate mechanical asset, which can then in turn enable a precise rotational alignment of a separate mechanical component to the separate mechanical asset using the mounting assembly. Such precise rotational alignments can be achieved independently of thread pitches, torque positions, and other features of the mechanical component, mounting assembly, and mechanical asset.

In some embodiments, one or more of the component threads can be designed and/or oriented in such a manner to facilitate the precise final rotational orientation of the separate mechanical component with respect to the separate mechanical asset. For example, thread 134 of threaded inner opening 132 can be oriented such that a simple rotational insertion and torquing of a separate mechanical component threaded post results in the desired rotational orientation of the separate mechanical component with respect to the separate mechanical asset. This can be accomplished when insert 130 is press fit or otherwise affixed inside of sleeve 120, which can be done with thread 134 at a desired proper orientation with respect to flat regions 123 around the outside of the sleeve. When sleeve 120 is then set at a desired rotational orientation with respect to the separate mechanical asset by using flat regions 123, thread 134 will be properly oriented such that insertion and installation of the separate mechanical component results in the desired precise rotational orientation of the mechanical component with respect to the mechanical asset.

In various embodiments, as noted above, installation of mechanical component 10 to mounting assembly 100 can involve a bottom surface of the mechanical component contacting and torquing against sleeve upper surface 128 of the mounting assembly. Due to the size, shape, and geometry of sleeve 120, this can sometimes result in just an "outer ring" of contact between mechanical component 10 and mounting assembly 100. As may be appreciated by those of skill in the art, increased mounting and fixture stiffness in the installed arrangement can be realized when the mechanical component contacts and is torqued only or primarily against sleeve upper surface 128, due to the relatively larger diameter of sleeve 120 and the geometrical nature of the various mounting assembly components. As will also be appreciated, increased mounting or fixture stiffness can ensure that an installed vibration sensor or other mechanical component can operate and respond robustly as designed within the overall arrangement. For example, ensuring that an installed vibration sensor contacts sleeve 120 directly can establish a more reliable mechanical link between the sensor, the mounting assembly, and ultimately the mechanical asset, which can then result in more consistent vibration transmission from asset to sensor.

Accordingly, insert 130 can be positioned somewhat lower within sleeve 120 such that its insert upper surface 138 is at a level that is below the level of sleeve upper surface 128, such as during formation of mounting assembly 100. In various arrangements, this can mean that mechanical component 10 never contacts insert upper surface 138. In other arrangements, contact and torque from the bottom surface of mechanical component 10 can also occur against insert upper surface 138 of insert 130, such as where the insert upper surface 138 is at or becomes flush with the sleeve upper surface 128. In the event that sleeve upper surface 128 is at a somewhat higher level than insert upper surface 138, for example, it may be possible in some situations that torquing mechanical component 10 into mounting assembly 110 can result in the bottom surface of the mechanical component initially contacting and torquing only against the sleeve upper surface but then contacting and torquing against both sleeve and insert upper surfaces before torquing is completed.

As noted above, insert 130 can be press fit, friction fit, or otherwise affixed inside of sleeve 120 such that these components are firmly affixed with respect to each other. This can result in no lateral movement or rotational displacement of insert 130 within sleeve 120. In some arrangements, this can involve a sufficiently strong press or friction fit such that no welding, glue, or other adhesives are used. In other arrangements, a suitable glue, adhesive, and/or weld can be used to facilitate affixing insert 130 to sleeve 120. For example, insert 130 can be press or friction fit into sleeve 120, whereupon a ring weld can then be formed between the insert and sleeve along the upper juncture between them. As shown in FIG. 3C, such a ring weld (not shown) could be formed below both sleeve upper surface 128 and insert upper surface 138 due to the beveling along the upper regions of both sleeve 120 and insert 130. As will be readily appreciated, this can provide another reason as to why it may be preferable for sleeve upper surface 128 to be above or flush with insert upper surface 138, since initial contact and torque of the sensor or other mechanical component against only the insert upper surface may raise the risk of weld fatigue or other relative press fit stability of insert 130 within sleeve 120.

Figure 4A:
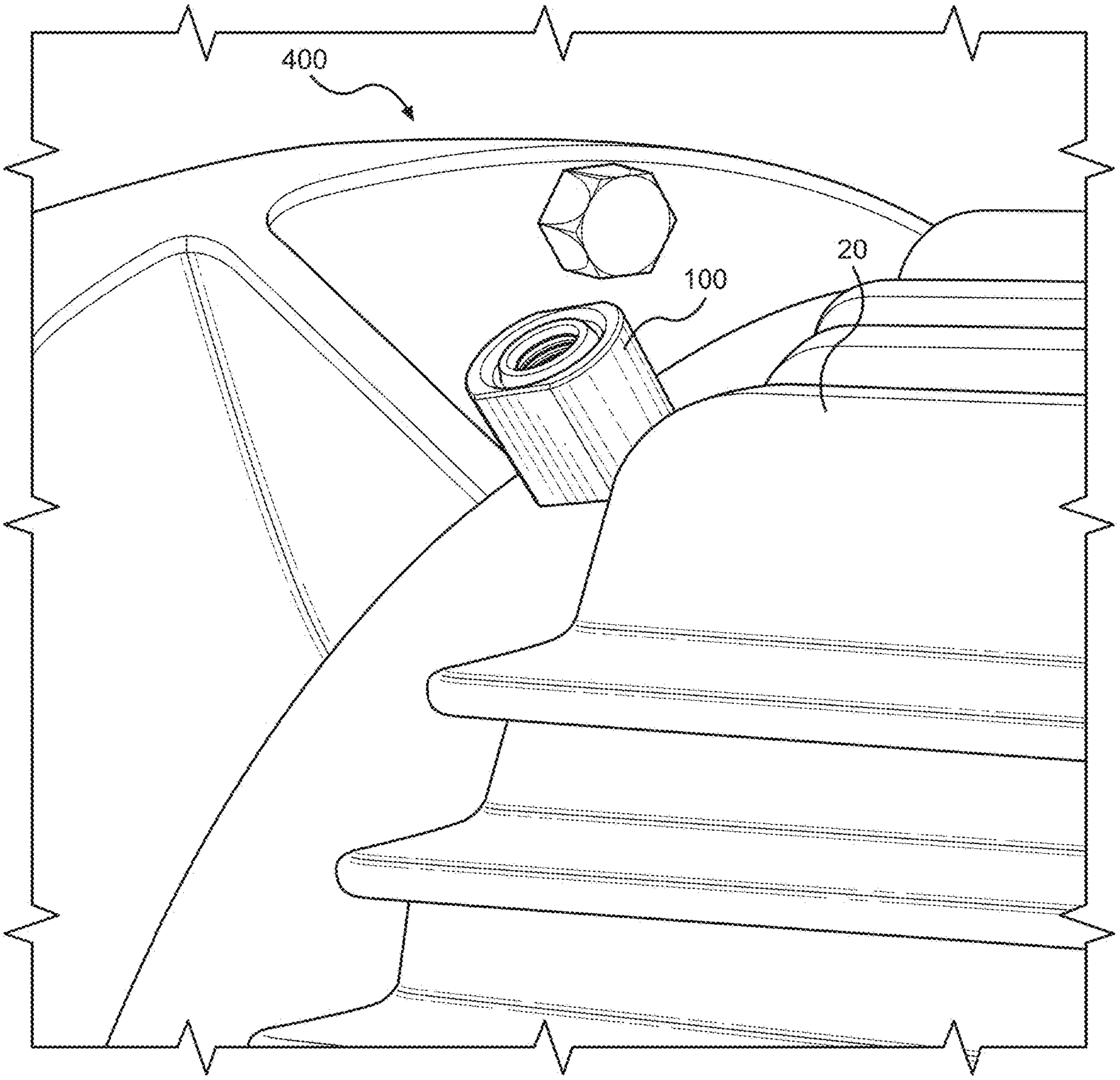
FIG. 4A illustrates in front perspective view an example mounting assembly coupled to a separate industrial motor according to one embodiment of the present disclosure.
Figure 4B:
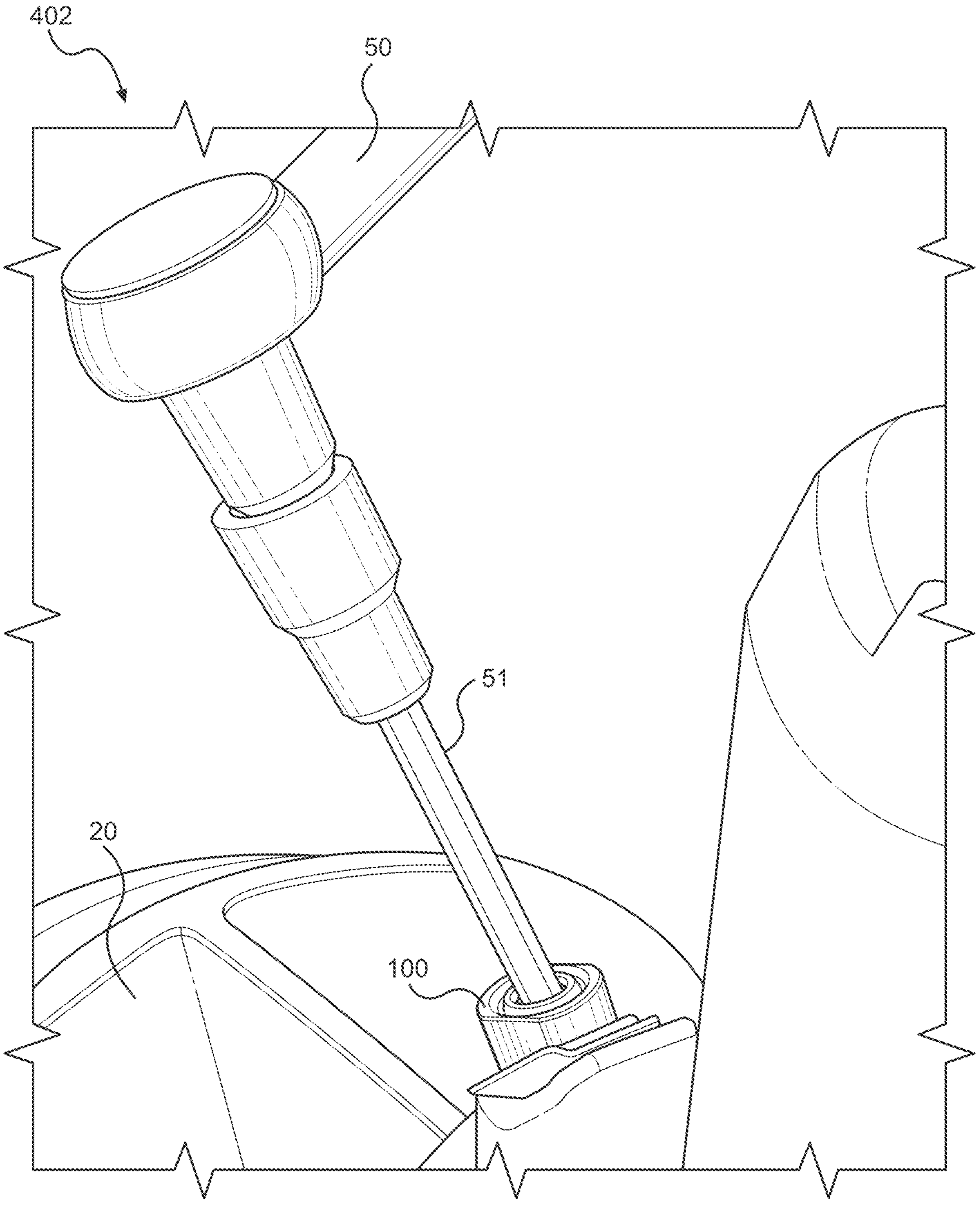
FIG. 4B illustrates in front perspective view an example step of tightening the example mounting assembly of FIG. 4A to the separate industrial motor according to one embodiment of the present disclosure.
Figure 4C:
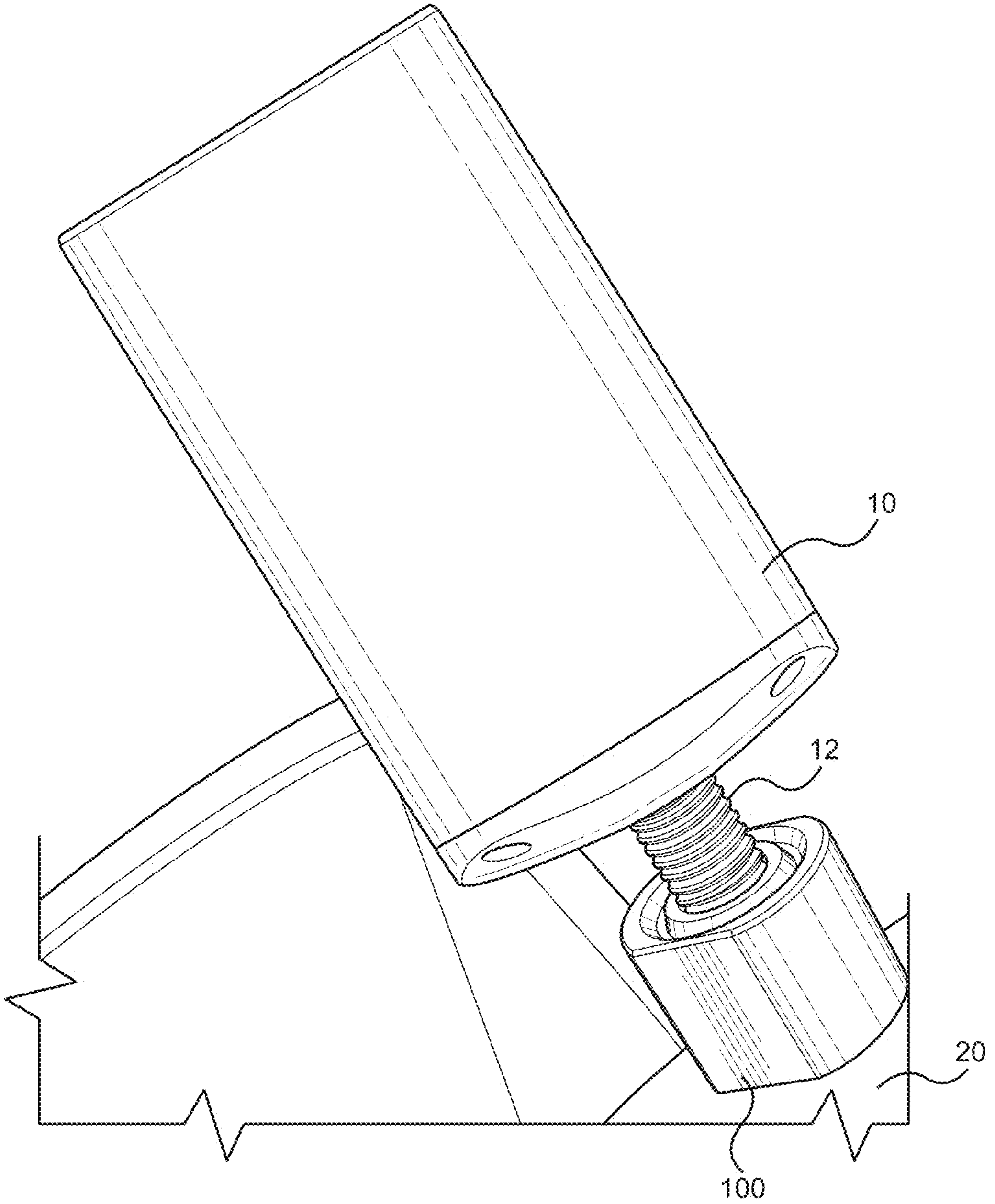
FIG. 4C illustrates in front perspective view an example step of coupling a separate vibration sensor to the example mounting assembly of FIG. 4A to mount the separate vibration sensor to the separate industrial motor using the mounting assembly according to one embodiment of the present disclosure.

FIGS. 4A through 4C illustrate in front perspective view various steps in the process of mounting a mechanical component to a mechanical asset using a mounting assembly as shown and described herein. FIG. 4A shows a mounting assembly coupled to an industrial motor, while FIG. 4B shows the step of tightening the mounting assembly to the industrial motor, and FIG. 4C shows the step of coupling a vibration sensor to the mounting assembly to result in mounting the vibration sensor to the industrial motor using the mounting assembly.

Configuration 400 of FIG. 4A reflects mounting assembly 100 being coupled to a separate mechanical asset 20, which can be an industrial motor, for example. Such a coupling can simply reflect a threaded protrusion of mounting assembly 100 being rotationally inserted into a threaded opening of separate mechanical asset 20. In some arrangements, the threaded opening can be created at an appropriate location on separate mechanical asset 20 to facilitate this rotational insertion as shown. As noted above, mounting assembly 100 can comprise three interlocking components that are readily operable as a combined unit. An operator or user can insert the threaded protrusion of mounting assembly 100 into the threaded opening and rotate the threaded protrusion until it begins to tighten inside the threaded opening.

Configuration 402 of FIG. 4B reflects the step of tightening mounting assembly 100 to the industrial motor or other separate mechanical asset 20. This can be done after a sleeve of mounting assembly 400 has been rotated to a desired rotational orientation. At that point, a box wrench or other suitable tool can be used to hold the sleeve in place, such as by placing the wrench or tool around flat regions of the sleeve. Torque wrench 50 can then be used to tighten a fastening component of mounting assembly 100. This can involve hex key 51 or another suitable screwdriving bit or extension that is coupled to torque wrench 50 being inserted through an insert of mounting assembly 100 to access a tightening feature on a top surface of a flange of the fastening component, as noted above. While holding the sleeve in place with the wrench, torque wrench 50 with hex key 51 can be used to tighten the fastening component of mounting assembly 100 into the threaded opening of separate mechanical asset 20 at a specifically desired torque or tightness.

This tightening can result in compressing components together to create a friction contact between the sleeve of mounting assembly 100 and an outer surface of separate mechanical asset 20 such that the sleeve is locked in place unable to rotate with respect to the mechanical asset. When the sleeve is properly positioned prior to torquing or tightening the fastening component, a desired angular or rotational orientation of the sleeve can be achieved without the use of adhesives. This locked rotational orientation can also by achieved without exposing threads on any component after the separate mechanical component is properly inserted into the threaded inner opening of mounting assembly 100.

Configuration 404 of FIG. 4C reflects the step of coupling a vibration sensor or other separate mechanical component 20 to mounting assembly 100. Such a coupling can produce a result of mounting separate mechanical component 10 (e.g., a vibration sensor) to separate mechanical asset 20 (e.g., an industrial motor) using mounting assembly 100. As shown, a threaded post or portion 12 of separate mechanical component 10 can be rotationally inserted into a threaded internal opening of mounting assembly 100. In some arrangements, threaded portion 12 can be rotationally fixed with respect to the rest of separate mechanical component 10 such that the entire mechanical component can be rotated or twisted to insert its threaded portion into the threaded internal opening. This can be done until a bottom surface of the vibration sensor or other separate mechanical component 10 contacts upper surface(s) of the mounting assembly 100, at which point the separate mechanical component can then be tightened to a suitable desired torque. As will be readily appreciated, this can involve the use of another box wrench or other suitable tool to tighten separate mechanical component 10 in place.

As shown and described in detail above, mounting assembly 100 generally provides improved threaded coupling arrangements that provide precise rotational alignments for coupled items, as well as various detailed technical benefits. For example, mounting assembly 100 can be scalable as desired for different applicational needs, and provides a single unit of interlocking mechanical parts that eliminates the need for multiple separate parts to be assembled on site. Mounting assembly 100 can be configured to maintain alignment of a separate mechanical component axis (e.g., vibration sensor threaded post axis) even during maintenance or partial disassembly of the separate mechanical component, separate mechanical asset, and/or mounting assembly. No adhesives are required, and no thread of any component is exposed after full mounting is completed. Field serviceability is also enhanced, as the separate mechanical component can be removed or replaced without disturbing the underlying mechanical assembly as already fastened to the separate mechanical asset. Manufacturing scalability is also enhanced, as the interference-fit design can simplify assembly and reduce dependency on the need for torque precision or additional locking features or components. Other advantages of disclosed mounting assembly 100 over existing mounting arrangements that provide for precise rotational orientations will be readily apparent to those of skill in the art.

Figure 5:
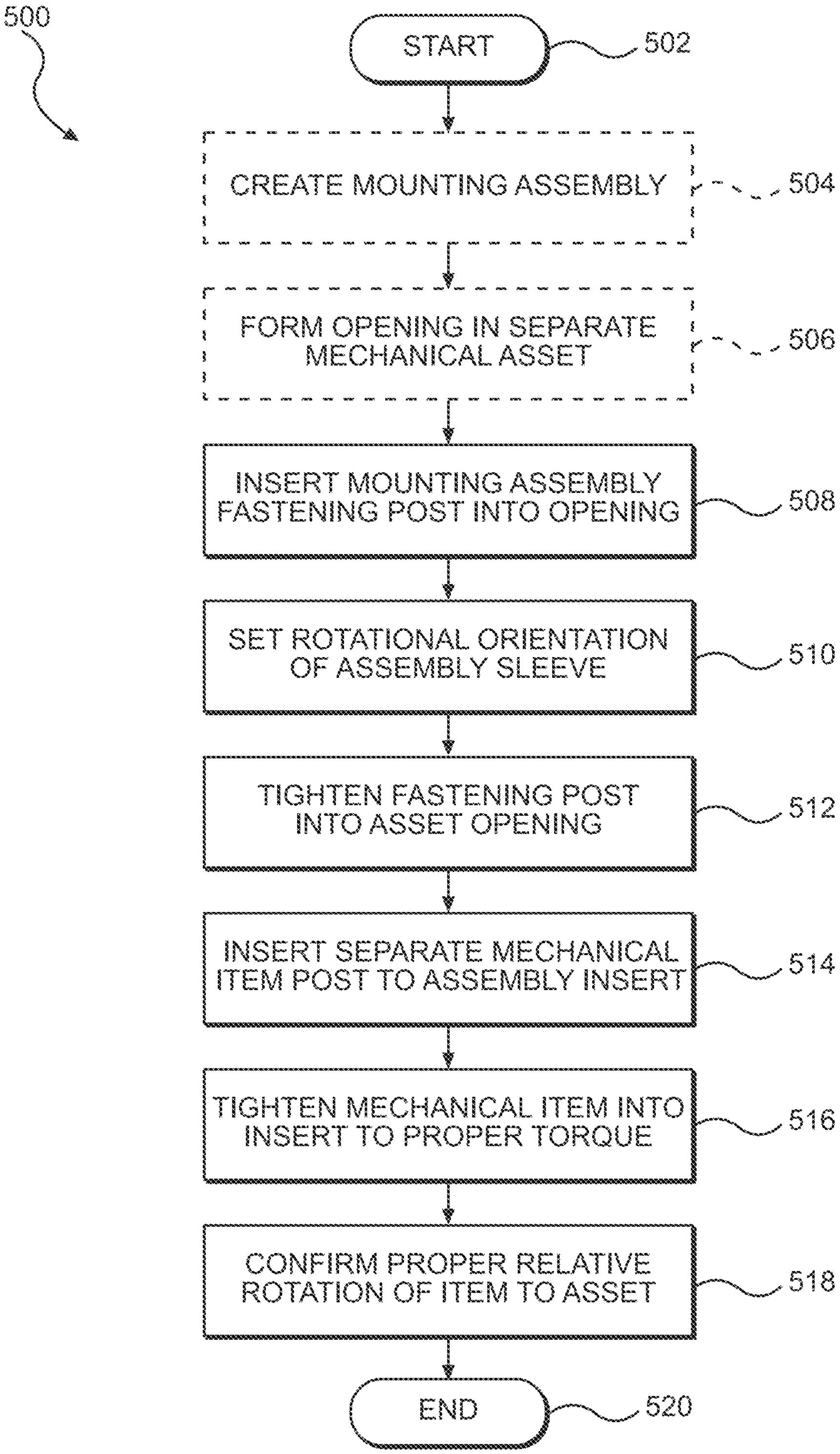
FIG. 5 illustrates a flowchart of an example detailed method of mounting a mechanical component to a mechanical asset using a mounting assembly according to one embodiment of the present disclosure.

FIG. 5 illustrates a flowchart of an example detailed method of mounting a mechanical component to a mechanical asset using a mounting assembly. Detailed method 500 can represent one possible way of mounting a mechanical component to a mechanical asset, and it will be understood that various other steps, features, and details of such a detailed method are not provided here for purposes of simplicity. Detailed method 500 can include some or all steps and details of summary method 200 above, as will be readily appreciated. While detailed method 500 contemplates mounting a vibration sensor to an industrial motor, for example, it will be readily appreciated that other mechanical components and/or other mechanical assets can alternatively be used.

After a start step 502, a first optional process step 504 can involve creating a mounting assembly. This can involve creating mounting assembly 100 as illustrated and described above using three different interlocking components. For example, a separate fastening component 110 can be inserted into an inner volume of a separate sleeve 120 such that its flange remains within the inner volume while its threaded protrusion extends through an endcap opening of the sleeve. A separate insert 130 can then be press fit or otherwise inserted into the sleeve 120 such that the flange of the fastening component 110 is fully constrained therein but is able to rotate with respect to the sleeve. Process step 504 can be optional, such as in situations where a finished mounting assembly does not already exist.

At the next optional process step 506, a threaded opening can be formed in the separate mechanical asset. This can be done using a suitable drill or other threaded opening forming tool, and can be done at a suitable location on the mechanical asset. The threaded opening formed can be sized and shaped to coincide with the size and shape of a threaded protrusion or post on the mounting assembly. Process step 506 can be optional, such as in situations where a suitable threaded opening does not already exist in the mechanical asset.

At a following process step 508, a mounting assembly threaded protrusion can be inserted into a threaded opening of the mechanical asset. This can also be considered coupling the mounting assembly to the mechanical asset. Step 508 can be identical or substantially similar to step 204 above in some arrangements. Again, the mounting assembly can include a fastening component with the threaded protrusion, a sleeve, and an insert, various arrangements for which are provided in detail herein.

Subsequent process step 510 can involve setting a rotational orientation of the mounting assembly with respect to the mechanical asset. Step 510 can be identical or substantially similar to step 206 above in some arrangements. This can involve setting a rotational orientation of a mounting assembly sleeve with respect to the mechanical asset, which can be done while a flange of the mounting assembly fastening component remains within an inner volume of the sleeve and the mounting assembly threaded protrusion extends away from the sleeve and into the threaded opening of the mechanical asset.

At the next process step 512, the fastening post (i.e., threaded protrusion) of the mounting assembly can be tightened into the mechanical asset threaded opening. Step 512 can be identical or substantially similar to step 208 above in some arrangements. Again, this can involve tightening the fastening post into the threaded opening until the mounting assembly sleeve cannot freely rotate with respect to the fastening component or to the mechanical asset. This can be done while the mounting assembly sleeve remains at the set rotational orientation.

At following process step 514, a threaded portion or post of the separate mechanical component or item can be inserted into an insert of the mounting assembly. Step 514 can be identical or substantially similar to step 210 above in some arrangements. This can involve rotatably inserting a threaded portion of the mechanical component into a threaded inner opening of the mounting assembly insert while the insert is fitted within the mounting assembly sleeve inner volume.

Process step 516 can involve tightening the separate mechanical component or item into the mounting assembly to a proper torque value. As noted above, this can be done using a box wrench or other suitable tool to rotate the vibration sensor or other mechanical component such that its threaded portion rotates into the threaded inner opening of the mounting assembly to the proper torque amount. This can result in a bottom surface of the mechanical component contacting one or more upper surfaces of the mounting arrangement, such as upper surfaces at one or both of a sleeve and insert of the mounting arrangement. Tightening to the proper torque amount can result in coupling the mechanical component to the mechanical asset at a specific rotational orientation relative to the mechanical asset.

The next process step 518 can involve confirming a proper relative rotational orientation of the separate mechanical component with respect to the separate mechanical asset. This can involve visually inspecting both items to ensure that the vibration sensor or other separate mechanical component is properly oriented as desired with respect to the industrial motor or other separate mechanical asset. Automated sensing or detection components can be used to measure such a rotational orientation if desired. In the event that a proper relative rotational orientation has not been achieved, then the separate mechanical component and/or the mounting assembly can be loosened and various steps can be repeated as may be necessary, as will be readily appreciated by those of skill in the art.

The method can then end at step 520. For foregoing detailed method 500, it will be appreciated that not all process steps are necessary, and that other process steps may be added in some arrangements. For example, steps 504 and 506 are unnecessary where a fully assembled mounting assembly and a suitable threaded opening in the mechanical asset already exist. Steps can also be performed in different orders where practical, and some steps can be performed simultaneously. For example, steps 508 and 510 can be performed at the same time. Although known process steps are provided for the various techniques in detailed method 500, it will be appreciated that other similar methods for mounting a mechanical component to a mechanical asset using a mounting assembly are also possible.

In some implementations, challenges may arise during the installation of mounting assembly 100 depending on the initial rotational orientations of the mounting assembly and its associated mechanical component 10. For example, after mounting assembly 100 has been tightened onto separate mechanical asset 20 and mechanical component 10 has subsequently been tightened onto the mounting assembly, the final orientation of the sensor relative to the asset is established. If the resulting orientation is incorrect, then mechanical component 10 may need to be removed from mounting assembly 100 so that the mounting assembly can be detached and re-oriented within the asset before a final torque is re-applied to all interfaces to ensure the sensor is secured in the proper orientation. Alternatively, if the components are already locked and tightened in place but the sensor orientation does not match the asset requirements, then additional installation steps may include rotating these items forward or backward to a desired final rotational orientation by applying a wrench to flat regions 123 of mounting assembly 100. This process can involve rotating mounting assembly 100 and mechanical component 10 together as a combined unit.

Depending on the amount of torque and the materials of these items, a significant amount of friction between components can exist, such as between fastening component 110 and sleeve 120 at the bottom surface of flange 114 and the top surface of endcap 124. This friction can then result in undesirable drag and additional rotation of one of these items when only the other is intended to be rotated such that it can be difficult to obtain the exact final rotational orientations desired for both items simultaneously. Where fastening component 110 and sleeve 120 are both formed from stainless steel, for example, then clamping these items together can result in the friction between flange 114 and endcap 124 being so high that these items cannot rotate with respect to each other and such that accurate rotational orientations are difficult or impossible to achieve. These issues can be further exacerbated by the fact that a limited number of final rotational orientations might be desirable over a full rotation (e.g., 360 degrees) of mounting assembly 100. For example, only two possible rotational orientations might be possible (e.g., 0 degrees and 180 degrees) due to there being only two opposing flat regions 123 on the outer surface of sleeve 120.

For example, rotating sleeve 120 further clockwise to adjust for a desired final orientation after the proper amount of torques have already been applied can over-torque fastening component 110, thus risking damage to mounting assembly 100 and/or mechanical asset 20. Conversely, rotating sleeve 120 counterclockwise to achieve a desired final orientation after the proper amount of torques have already been applied can loosen threaded protrusion 112 from threaded opening 22 on mechanical asset 20, which compromises mounting integrity.

Another issue that can arise during installation also involves the existence of only two opposing flat regions 123 on the outer surface of sleeve 120. As noted above, flat regions 123 can be used to accommodate a standard sized wrench or tool for torquing sleeve 120 during installation. In some situations, however, an installation location for mounting assembly 100 and mechanical component 10 can be difficult. These can involve, for example, tight spaces near walls or where other items or components are in close proximity, such that an operator may have difficulty using a standard sized wrench or tool to tighten or loosen sleeve 120 directly. For at least the foregoing reasons, additional components and features can be provided in an alternative mounting assembly that may be beneficial in various installations.

Turning next to FIGS. 6A through 6D, alternative mounting assembly 600 is illustrated in top perspective, bottom perspective, side perspective cross-section, and side elevation cross-section views respectively. Alternative mounting assembly 600 can be similar to mounting assembly 100 shown and described above in many aspects. For example, alternative mounting assembly 600 can include an interlocking fastening component, sleeve, and insert, each of which can have identical or substantially similar features and functionalities to the counterpart components found in mounting assembly 100. Unlike the foregoing embodiments, however, alternative mounting assembly 600 can include additional flat regions around the outer surface of its sleeve and a reduced friction element that can be located within the inner volume of the mounting assembly. These added features and items can overcome or at least minimize the noted issues that can occur during installation of the disclosed mounting assemblies.

Figure 6A:
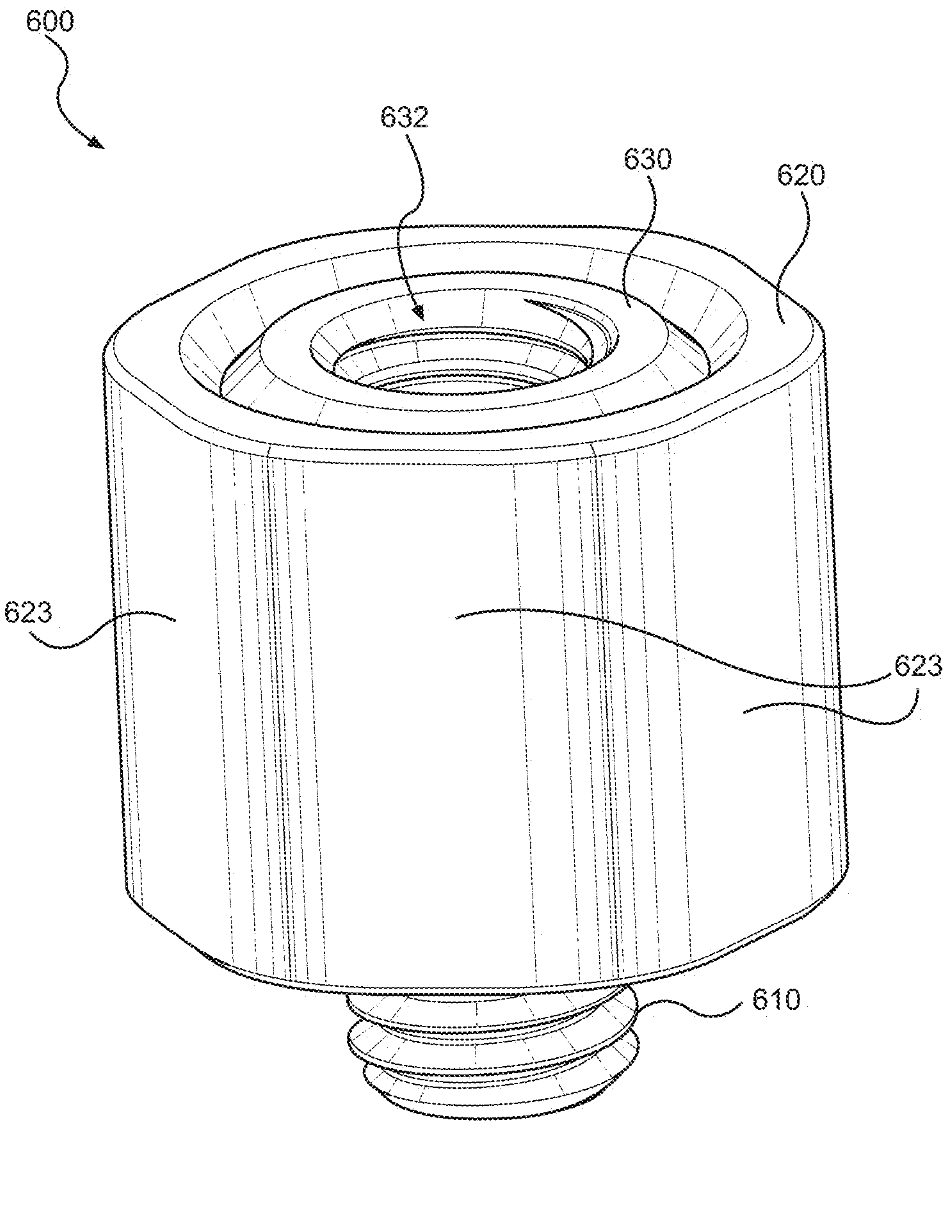
FIG. 6A illustrates in top perspective view an example alternative mounting assembly according to one embodiment of the present disclosure.
Figure 6B:
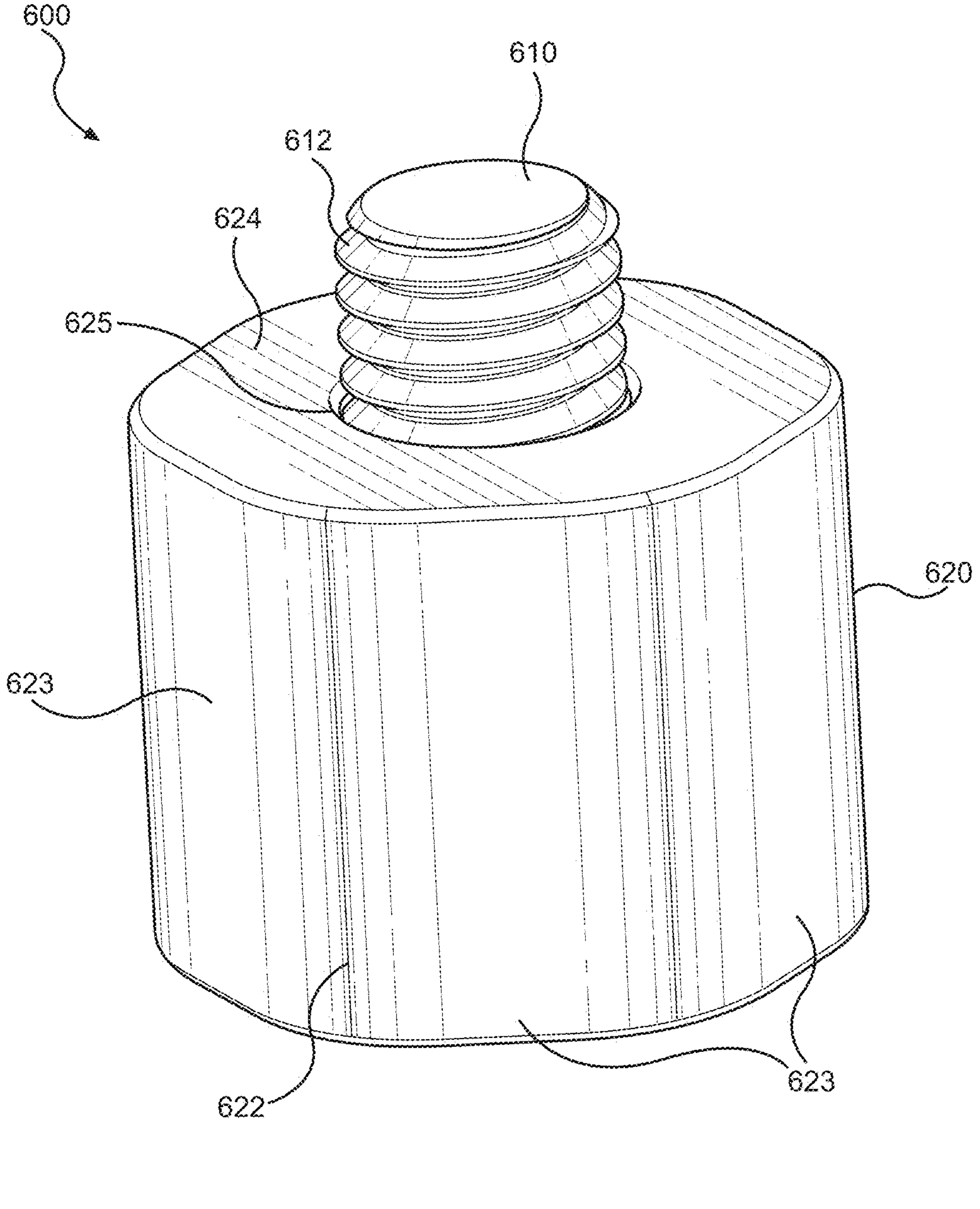
FIG. 6B illustrates in bottom perspective view the alternative mounting assembly of FIG. 6A according to one embodiment of the present disclosure.

Similar to FIGS. 3A and 3B above, FIGS. 6A and 6B show outer views of alternative mounting assembly 600, which can include fastening component 610, sleeve 620, and insert 630. Except where otherwise noted herein, it will be understood that each of these components can have identical or substantially similar features and functionalities to the counterpart components found in mounting assembly 100 above. For example, alternative mounting assembly 600 can include threaded inner opening 632 in insert 630, with this threaded inner opening being aligned along a longitudinal axis of threaded protrusion 612 of fastening component 610 and configured to accept a rotational insertion therein of a threaded portion of a vibration sensor or other suitable separate mechanical component. Alternative mounting assembly 600 can also include the same threaded protrusion 612 of fastening component 610 and the same endcap 624 and endcap opening 125 of sleeve 620 that can be sized and shaped to allow threaded post or protrusion 612 of fastening component 610 to pass therethrough, among other identical features.

Unlike the foregoing embodiments, alternative mounting assembly 600 can include a sleeve 620 having more than just two opposing flat regions 623 around its outer surface. For example, six flat regions 623 can be spaced apart around partially circular outer wall 622 of sleeve 620, with this distribution of flat regions or surfaces being similar to the kind of geometry found on typical hex nuts or bolt heads. The six flat regions 623 can thus be arranged to form three pairs of opposing flat regions. More or fewer flat regions 623 can be provided in further alternative embodiments as may be desired. As will be readily appreciated, having additional flat regions 623 can result in a greater ability to access these flat regions with a wrench or other tool for tightening or loosening sleeve 620. Having additional flat regions 623 can also provide more correct rotational positions over a full rotation of the sleeve when installing alternative mounting assembly 600. These advantages can be realized without the need to have a sleeve 620 that is asymmetrical, as will be readily appreciated.

Figure 6C:
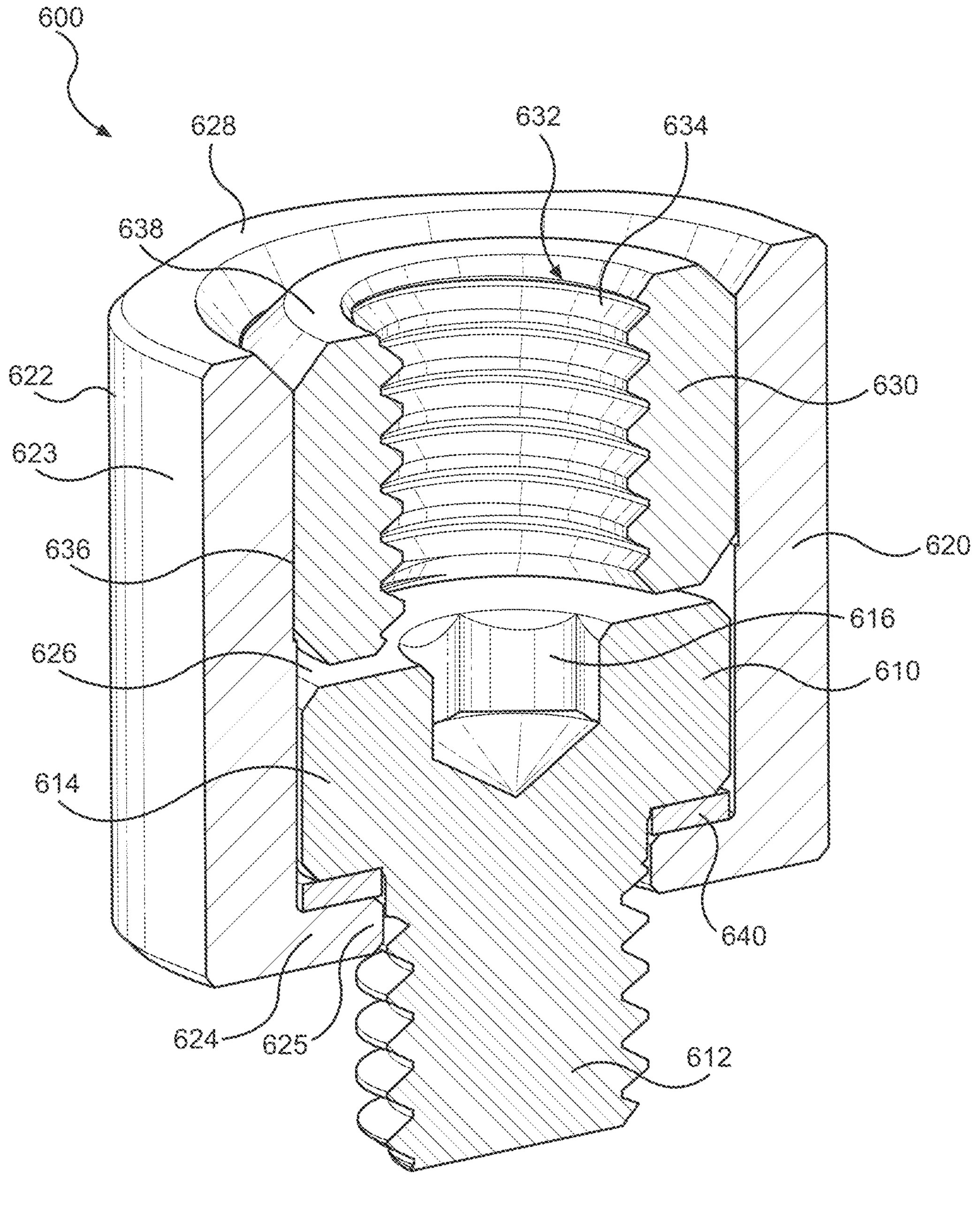
FIG. 6C illustrates in side perspective cross-section view the alternative mounting assembly of FIG. 6A according to one embodiment of the present disclosure.
Figure 6D:
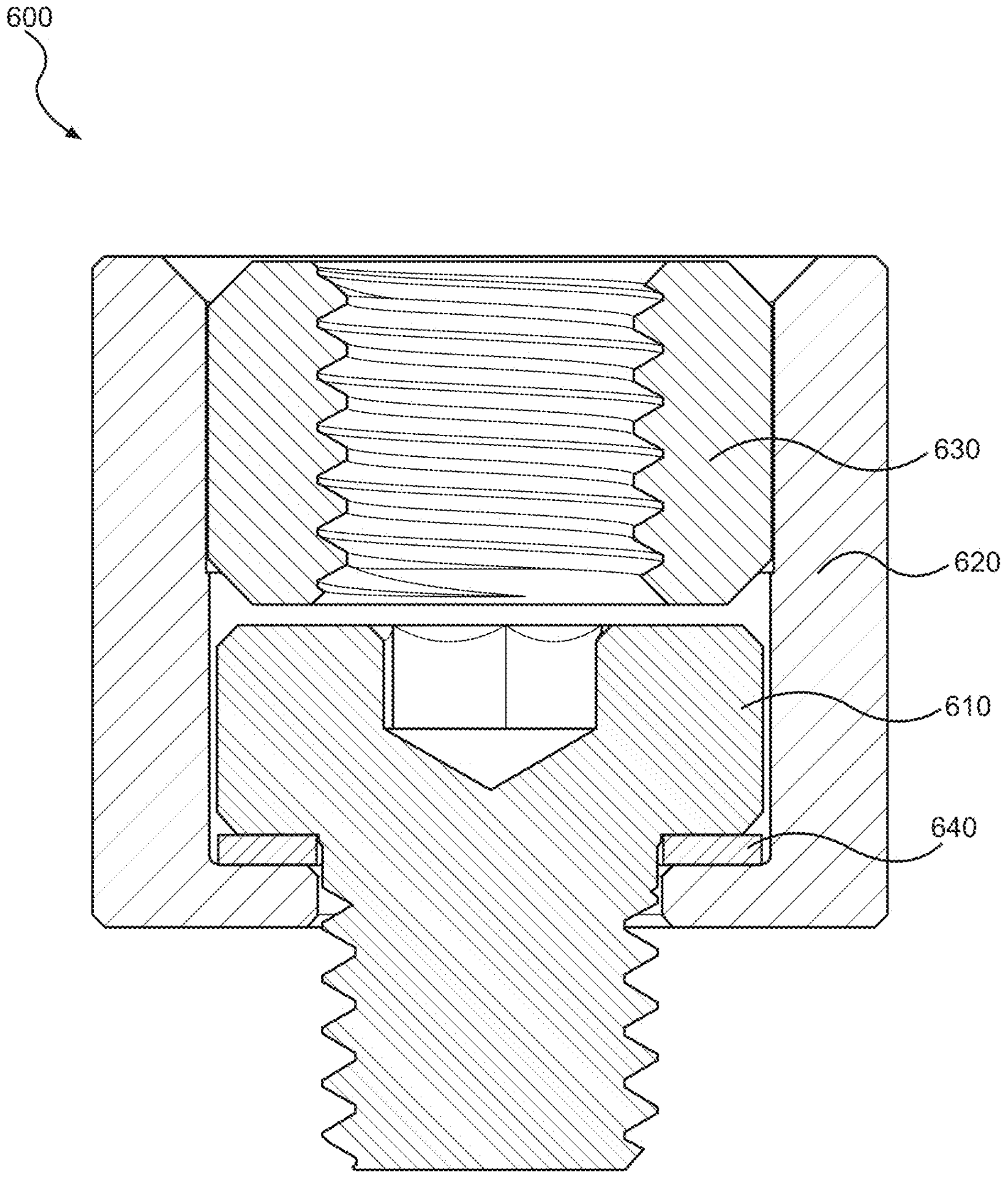
FIG. 6D illustrates in side elevation cross-section view the alternative mounting assembly of FIG. 6A according to one embodiment of the present disclosure.

Similar to FIG. 3C above, FIGS. 6C and 6D show cross-section views of alternative mounting assembly 600 such that all internal components and features can be seen. Again, it will be understood that each of the components of alternative mounting assembly 600 can have identical or substantially similar features and functionalities to counterpart components found in mounting assembly 100 above except where otherwise noted herein. These can include threaded protrusion 612, flange 614, and tightening feature 616 of fastening component 610, and also outer wall circular regions 622, outer wall flat regions 623, endcap 624, sleeve opening 625, inner volume 626, and sleeve upper surface 628 of sleeve 620. These can also include inner opening 632, thread 634, outer wall surface 636, and insert upper surface 638 of insert 630, among other identical or similar items and features.

In addition to fastening component 610, sleeve 620, and insert 630 as primary components, alternative mounting assembly 600 can also include reduced friction element 640. As shown, this reduced friction element 640 can be located between fastening component 610 and sleeve 620, and in particular between the bottom surface of flange 614 and the top surface of endcap 624. Reduced friction element 640 can be specifically designed and positioned to create a "slip interface" and reduce friction significantly between flange 614 and endcap 624, particularly when fastening component has been at least partially tightened to create a clamping force from the flange down onto the endcap. As will be readily appreciated, fastening component 610 and sleeve 620 can experience friction at flange 614 and endcap 624, particularly when these features are in direct contact. This friction can be problematic or excessive when fastening component 610 and sleeve 620 are formed from some materials, such as stainless steel, as will be readily appreciated.

Reduced friction element 640 can thus be introduced to alleviate issues with undue friction between these components. In particular, reduced friction element 640 can be located between fastening component flange 614 and sleeve endcap 624. Reduced friction element 640 can create a slip interface that is configured to substantially reduce rotational friction between fastening component 610 at its flange 614 and sleeve 620 at its endcap 624 when the fastening component is clamped onto the sleeve and rotational torque is applied to the fastening component or the sleeve. This slip interface allows the mechanical component (e.g., vibration sensor) and mounting assembly 600 to be rotated together as a fixed unit relative to the mechanical asset even while the assembly is under a significant clamping load. This slip interface (i.e., reduced friction element 640) can be configured such that it does not interfere with the amount of clamping load between mounting assembly 600 and the mechanical asset, and does not interfere with or compromise vibration transmission through the mounting assembly, which can be particularly useful where the mechanical component is a vibration sensor that monitors vibrations in the mechanical asset.

In some arrangements, reduced friction element 640 can be a washer that is inserted into sleeve 620 before fastening component 610 is then inserted into the sleeve atop the reduced friction element. Reduced friction element 640 can be formed from a different material from both fastening component 610 and sleeve 620, and preferably from a material that is low-friction, chemically inert, and resistant to high temperatures and/or high pressures. As such, reduced friction element 640 can be a washer formed from a polytetrafluoroethylene ("PTFE") material (e.g., Teflon). Reduced friction element 640 can have an outer diameter that is about the same as the outer diameter of fastening component flange 614, an inner opening diameter that is slightly larger than the outer diameter of fastening component threaded protrusion 612, and a thickness that is minimal yet sufficient to withstand the pressure delivered between fastening component 610 and sleeve 620 when these components are torqued or tightened together to their maximum preferred levels.

In various embodiments, further properties of reduced friction element 640 will be readily appreciated and can be extrapolated ion some instances from that which is provided in foregoing embodiments. For example, reduced friction element 640 can be assembled into alternative mounting assembly 600 such that it defines a central longitudinal axis that is the same central longitudinal axis as for each of fastening component 610, sleeve 620, and insert 630. Furthermore, reduced friction element 640 can be disposable and readily replaced in some instances due to its thin and inexpensive nature. For example, some installations of alternative mounting assembly 600 may result in overcompression or other deformation of reduced friction element 640. This can result in an installation that works properly but may require replacement with a new reduced friction element 640 if the separate mechanical component is ever removed and reinstallation is desired. In some arrangements, however, reduced friction element 640 can have a geometry that allows it to be reused over multiple different installations, such as a sufficient thickness to withstand multiple compressions.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details but rather is to be defined by the scope of the appended claims.

What is claimed is:

1. A mounting system, comprising:

a sensor having a sensor protrusion with a threaded portion configured to facilitate mounting the sensor to a separate mechanical asset that is larger than the sensor; and a mounting assembly configured to be coupled to the sensor, the mounting assembly including:

a fastening component including a threaded protrusion extending from a flange, the threaded protrusion defining a longitudinal axis and a first diameter and the flange defining a second diameter that is greater than the first diameter, wherein the threaded protrusion is configured to be rotationally inserted into a threaded opening of the separate mechanical asset;

a sleeve having one or more walls coupled to an endcap at one end thereof to define an inner volume having a sleeve opening at another end opposite the endcap, the inner volume being configured to hold the flange therein such that the flange is rotatable within the inner volume, wherein the endcap includes an endcap opening configured to allow the threaded protrusion to pass therethrough while the flange remains within the inner volume;

an insert fitted within the sleeve opening such that the flange is fully constrained within the inner volume, the insert including a threaded inner opening aligned along the longitudinal axis of the fastening component threaded protrusion and configured to accept a rotational insertion therein of the sensor protrusion threaded portion while the sensor is located outside the sleeve such that the sensor is configured to couple to the separate mechanical asset at a specific rotational orientation relative to the separate mechanical asset; and a reduced friction element located between the fastening component flange and the sleeve endcap, wherein the reduced friction element substantially reduces rotational friction between the fastening component flange and the sleeve endcap when the fastening component is clamped onto the sleeve and rotational torque is applied to the fastening component or the sleeve.

2. The mounting system of claim 1, wherein the reduced friction element is a washer having an outer diameter that is about the same as an outer diameter of the fastening component flange and an inner opening diameter that is slightly larger than an outer diameter of the fastening component threaded protrusion.

3. The mounting system of claim 1, wherein the reduced friction element is formed from a polytetrafluoroethylene ("PTFE") material.

4. The mounting system of claim 1, wherein the fastening component includes a tightening feature at a top surface of the flange, the tightening feature configured to facilitate rotational tightening of the threaded protrusion into the threaded opening of the separate mechanical asset, and wherein the tightening feature is configured to be accessed via the threaded inner opening of the insert while the flange is fully constrained within the inner volume of the sleeve.

5. The mounting system of claim 1, wherein the fastening component and the sleeve are configured such that the rotational orientation of the sleeve becomes fixed when the threaded protrusion of the fastening component is sufficiently tightened into the threaded opening of the separate mechanical asset.

6. The mounting system of claim 1, wherein the one or more walls of the sleeve define an outer surface that includes at least three pairs of opposing flat regions.

7. The mounting system of claim 1, wherein the insert is rigidly coupled to the sleeve within the sleeve opening such that the insert is laterally and rotationally fixed with respect to the sleeve.

8. The mounting system of claim 7, wherein the insert is press fit within the sleeve.

9. The mounting system of claim 1, wherein an internal thread of the threaded inner opening has a rotational orientation arranged to match at least one exterior feature of the sleeve.

10. The mounting system of claim 9, wherein tightening the threaded portion of the sensor protrusion into the threaded inner opening of the insert to a specified torque value results in achieving an exact rotational orientation of the sensor relative to an exterior feature of the sleeve.

11. The mounting system of claim 10, wherein tightening the threaded portion of the sensor protrusion into the threaded inner opening of the insert to the specified torque value while the mounting assembly is fastened to the separate mechanical asset results in the exact rotational orientation corresponding to the specific rotational orientation of the sensor relative to the separate mechanical asset.

12. The mounting system of claim 1, wherein the sleeve includes an upper surface configured to contact and provide a physical stop against a bottom surface of the sensor when the threaded portion of the sensor is inserted into and sufficiently rotated within the threaded inner opening.

13. The mounting system of claim 12, wherein the insert has an upper surface arranged to be lower than or flush with the upper surface of the sleeve.

14. A method of mounting a sensor to a separate mechanical asset using the mounting system of claim 1, the method comprising:

coupling the mounting assembly to the threaded opening within the separate mechanical asset, wherein the coupling includes inserting the threaded protrusion of the fastening component into the threaded opening of the separate mechanical asset;

setting a rotational orientation of the sleeve with respect to the separate mechanical asset while the flange of the fastening component remains within an inner volume of the sleeve and the threaded protrusion extends away from the sleeve and into the threaded opening of the separate mechanical asset;

tightening the fastening component into the threaded opening of the separate mechanical asset until the sleeve cannot freely rotate with respect to the fastening component or to the separate mechanical asset; and coupling the sensor to the mounting assembly by rotatably inserting the sensor protrusion threaded portion into the threaded inner opening of the insert while the insert is fitted within the inner volume such that the sensor is coupled to the separate mechanical asset at a specific rotational orientation relative to the separate mechanical asset.

15. The method of claim 14, further comprising the steps of:

creating the mounting assembly;

forming the threaded opening within the separate mechanical asset;

tightening the sensor into the insert to a proper torque; and confirming that the specific rotational orientation is a proper relative rotation of the sensor to the separate mechanical asset.

16. A mounting system configured to mount a sensor to a separate mechanical asset, the mounting assembly comprising:

the sensor, wherein the sensor includes a sensor protrusion with a threaded portion configured to facilitate mounting the sensor to the separate mechanical asset; and a mounting assembly configured to be coupled to the sensor, the mounting assembly including:

a fastening component including a threaded protrusion extending from a flange, the threaded protrusion defining a first diameter and the flange defining a second diameter that is greater than the first diameter, wherein the threaded protrusion is configured to be rotationally inserted into a threaded opening of the separate mechanical asset, and wherein the fastening component includes a tightening feature at a top surface of the flange, the tightening feature configured to facilitate rotational tightening of the threaded protrusion into the threaded opening of the separate mechanical asset;

a sleeve having one or more walls coupled to an endcap at one end thereof to define an inner volume having a sleeve opening at another end opposite the endcap, the inner volume being configured to hold the flange therein such that the flange is rotatable within the inner volume, wherein the endcap includes an endcap opening configured to allow the threaded protrusion to pass therethrough while the flange remains within the inner volume;

an insert fitted within the sleeve opening such that the insert is unable to move relative to the sleeve and the flange is fully constrained within the inner volume, the insert including a threaded inner opening configured to accept a rotational insertion therein of the sensor protrusion such that the sensor is configured to mount to the separate mechanical asset at a specific rotational orientation relative to the separate mechanical asset, wherein the tightening feature of the fastening component is configured to be accessed via the threaded inner opening of the insert while the flange is fully constrained within the inner volume of the sleeve; and a reduced friction element located between the fastening component flange and the sleeve endcap, wherein the reduced friction element substantially reduces rotational friction between the fastening component flange and the sleeve endcap when the fastening component is clamped onto the sleeve and rotational torque is applied to the fastening component or the sleeve.

17. The mounting system of claim 16, wherein the reduced friction element is a washer having an outer diameter that is about the same as an outer diameter of the fastening component flange and an inner opening diameter that is slightly larger than an outer diameter of the fastening component threaded protrusion.

18. The mounting system of claim 16, wherein the reduced friction element is formed from a polytetrafluoroethylene ("PTFE") material.

19. The mounting system of claim 16, wherein the one or more walls of the sleeve define an outer surface that includes at least three pairs of opposing flat regions.

20. The mounting system of claim 16, wherein each of the fastening component, the sleeve, the insert, and the reduced friction element defines a central longitudinal axis, and wherein each of these central longitudinal axes align with each other and are configured to align with central longitudinal axes of the threaded opening of the separate mechanical asset and the sensor protrusion threaded portion when the mounting assembly mounts the sensor to the separate mechanical asset.

* * * * *